US012235978B2

(12) United States Patent
Ghosh et al.

(10) Patent No.: US 12,235,978 B2
(45) Date of Patent: Feb. 25, 2025

(54) METHOD AND SYSTEM OF PROTECTING SENSITIVE CONTENT FROM PHOTOGRAPHY

(71) Applicant: Microsoft Technology Licensing, LLC, Redmond, WA (US)

(72) Inventors: Kushal Ghosh, Bangalore (IN); Chandramouli Gopalakrishnan, Bangalore (IN); Hitesh Kumar Manwar, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 17/843,016

(22) Filed: Jun. 17, 2022

(65) Prior Publication Data
US 2023/0409721 A1 Dec. 21, 2023

(51) Int. Cl.
*G06F 21/62* (2013.01)
*G06F 21/84* (2013.01)

(52) U.S. Cl.
CPC .......... *G06F 21/6209* (2013.01); *G06F 21/84* (2013.01)

(58) Field of Classification Search
CPC ...... G06F 21/60; G06F 21/62; G06F 21/6209; G06F 21/70; G06F 21/71; G06F 21/74; G06F 21/75; G06F 21/82; G06F 21/84
See application file for complete search history.

(56) References Cited

U.S. PATENT DOCUMENTS

| | | | | |
|---|---|---|---|---|
| 5,805,311 A | * | 9/1998 | Phillips | H04N 1/482 358/538 |
| 5,841,247 A | * | 11/1998 | Vriens | G09G 1/04 313/403 |
| 10,013,228 B2 | | 7/2018 | Aurongzeb et al. | |
| 10,607,575 B2 | | 3/2020 | Iwaki et al. | |
| 11,521,578 B2 | * | 12/2022 | Boyack | G09G 5/14 |
| 11,550,954 B1 | * | 1/2023 | Jonak | G06F 21/78 |
| 2013/0057902 A1 | | 3/2013 | Henry et al. | |

(Continued)

FOREIGN PATENT DOCUMENTS

CN 112163246 A 1/2021

OTHER PUBLICATIONS

"Moire Pattern", Retrieved from: https://en.wikipedia.org/wiki/Moir%C3%A9_pattern, Jan. 9, 2022, 13 Pages.

(Continued)

*Primary Examiner* — Boris D Grijalva Lobos
(74) *Attorney, Agent, or Firm* — NovoTechIP International PLLC

(57) ABSTRACT

A system and method for preventing circumvention of content security measures includes receiving a request to display a content on a display screen and determining whether the content includes sensitive information. Upon determining that the content includes sensitive information, a request is transmitted to an operating system associated with the display screen to modify a plurality of display settings of the display screen from original display settings to modified display settings, the plurality of display settings including a screen refresh rate and a screen refresh line width, where the modified display settings prevent circumvention of content security through taking a photograph of the display screen.

15 Claims, 8 Drawing Sheets

(56) References Cited

U.S. PATENT DOCUMENTS

| | | | | |
|---|---|---|---|---|
| 2015/0009248 | A1* | 1/2015 | Bracalente | H04N 5/913 |
| | | | | 345/691 |
| 2015/0206574 | A1 | 7/2015 | Greathouse et al. | |
| 2015/0371613 | A1* | 12/2015 | Patel | G09G 5/395 |
| | | | | 345/549 |
| 2016/0063265 | A1* | 3/2016 | Griffith | H04N 5/265 |
| | | | | 726/33 |
| 2016/0125193 | A1* | 5/2016 | Dai Zovi | G06F 21/6209 |
| | | | | 726/28 |
| 2017/0104893 | A1 | 4/2017 | Hardy et al. | |
| 2019/0036994 | A1 | 1/2019 | Ngalle et al. | |
| 2021/0034793 | A1* | 2/2021 | Wang | G06F 21/60 |
| 2021/0142761 | A1 | 5/2021 | Childers et al. | |
| 2021/0280156 | A1 | 9/2021 | Mehta et al. | |
| 2021/0321059 | A1 | 10/2021 | Mattioli et al. | |
| 2023/0244823 | A1* | 8/2023 | Iyer | G06F 21/84 |
| | | | | 726/26 |
| 2023/0412203 | A1* | 12/2023 | Sambhwani | H04B 1/1027 |

OTHER PUBLICATIONS

"Preventing leaks of Sensitive Information with the Help of Office 365—Part I (IRM)", Retrieved from: https://www.softeng.es/en-us/blog/preventing-leaks-of-sensitive-information-with-the-help-of-office-365-part-i-(irm).html, Feb. 26, 2014, 3 Pages.

Bailey, et al., "Microsoft Information Protection in Microsoft 365", Retrieved from: https://web.archive.org/web/20220124200838/https://docs.microsoft.com/en-us/microsoft-365/compliance/information-protection?view=o365-worldwide, Jan. 25, 2022, 5 Pages.

Nakanishi, et al., "Generating Visual Flickers for Eliciting Robust Steady-State Visual Evoked Potentials at Flexible Frequencies Using Monitor Refresh Rate", In Journal of Plos One, vol. 9, Issue 6, Jun. 11, 2014, pp. 1-12.

"International Search Report and Written Opinion Issued in PCT Application No. PCT/US23/019695", Mailed Date: Jul. 24, 2023, 11 Pages.

* cited by examiner

METHOD AND SYSTEM OF PROTECTING SENSITIVE CONTENT FROM PHOTOGRAPHY

BACKGROUND

Many of today's software applications offer features for protecting certain sensitive contents. For example, some communication applications such as email applications provide options for users to label their messages as containing sensitive information. In an example, email messages can be identified as being normal, personal, private, or confidential. When a document is labeled as containing sensitive information, the application that provides access to the document often offers different forms of protection for the content. For example, when an email is labeled as being confidential, the content may be protected (e.g., via Secure/Multipurpose Internet Mail Extensions), and a password may be required to view the content.

Furthermore, the application may offer other forms of protection to ensure security of the content. For example, the application may prevent the message from being forwarded to others. In another example, the content may be marked as read-only, thus preventing the receiver from copying and pasting the content. In yet another example, the user may be prevented from taking a screenshot of the content. While these protections are useful in preventing many forms of unauthorized use of sensitive content, they do not prevent the user from taking a picture of the content. Given the fact that many users have easy access to cameras, this shortcoming results in a substantial risk to the security of sensitive content.

Hence, there is a need for improved systems and methods of protecting sensitive digital content.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request to display a content on a display screen, upon receiving the request, determining that the content includes sensitive information, and upon determining that the content includes sensitive information, transmitting a first request to an operating system associated with the display screen to modify a plurality of display settings of the display screen from original display settings to modified display settings, the plurality of display settings including a screen refresh rate and a screen refresh line width, wherein the modified display settings prevent circumvention of content security through taking a photograph of the display screen.

In yet another general aspect, the instant disclosure presents a method preventing circumvention of content security measures. In some implementations, the method includes receiving a request to display a content on a display screen, upon receiving the request, determining that the content includes sensitive information, and upon determining that the content includes sensitive information, transmitting a first request to an operating system associated with the display screen to modify a plurality of display settings of the display screen from original display settings to modified display settings, the plurality of display settings including a screen refresh rate and a screen refresh line width, wherein the modified display settings prevent circumvention of content security through taking a photograph of the display screen.

In a further general aspect, the instant application describes a non-transitory computer readable medium on which are stored instructions that when executed cause a programmable device to perform function of receiving a request to display a content on a display screen, upon receiving the request, determining that the content includes sensitive information, and upon determining that the content includes sensitive information, transmitting a first request to an operating system associated with the display screen to modify a plurality of display settings of the display screen from original display settings to modified display settings, the plurality of display settings including a screen refresh rate and a screen refresh line width, wherein the modified display settings prevent circumvention of content security through taking a photograph of the display screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
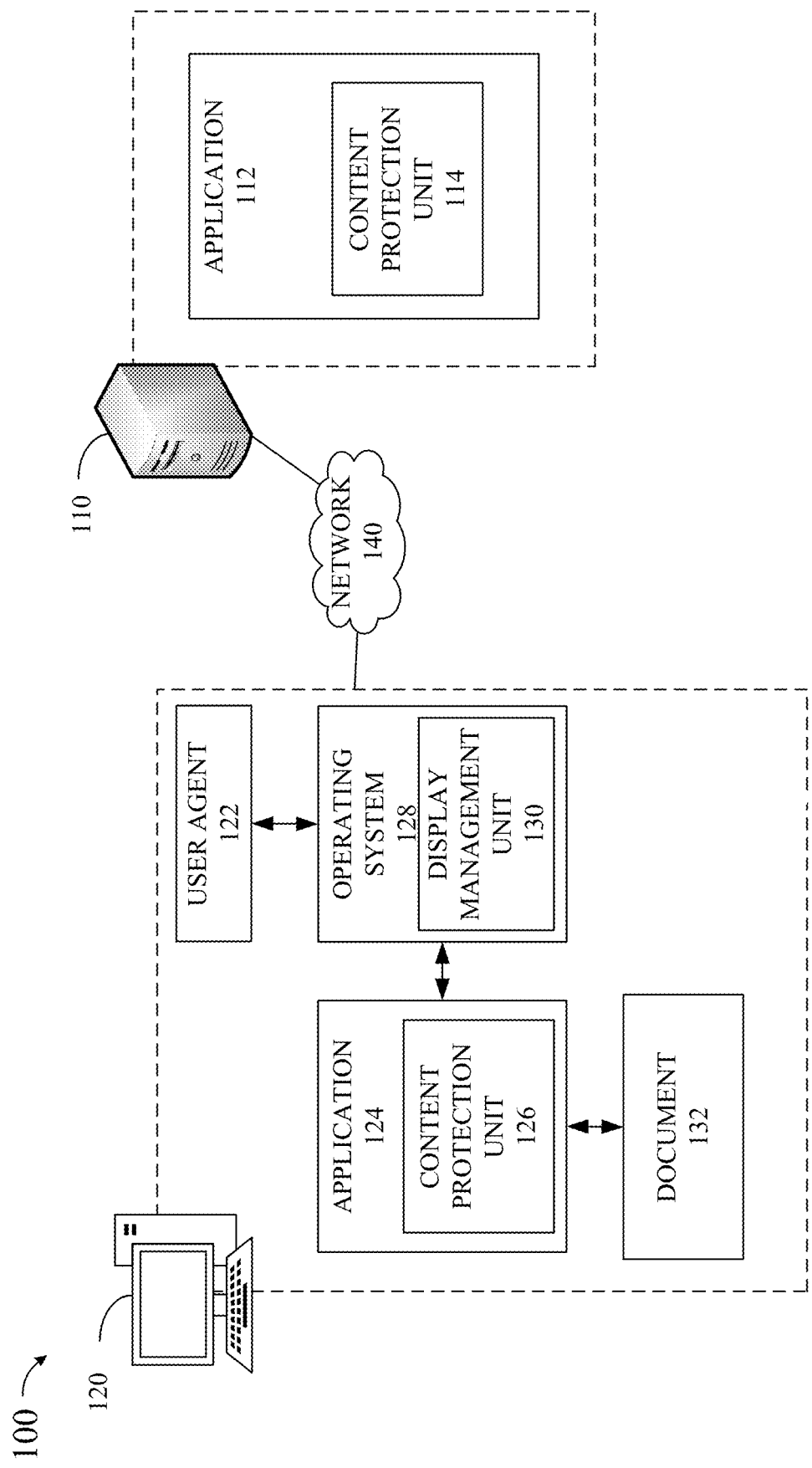
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

It is common for users of communication applications or productivity applications to generate documents that contain sensitive information. The sensitive information may be personal, private or confidential. To ensure the security of such content, many applications offer features for protecting such content. These features may include encrypting the content, requiring a password for opening the document containing the content, making the document read-only, preventing a receiver from sharing the content with an authorized user (e.g., forwarding an email or text message) and the like. While these features prevent many forms of security breaches, they leave open an easy and common method of storing and sharing information. In today's environment, most users have access to a digital camera (e.g., via their mobile phone). Thus, an authorized user/receiver of protected content can easily take a picture of protected content. The picture can be stored in a non-secure storage medium and may be shared with unauthorized users, thus obviating the many forms of protection offered by the application and risking the security of the content. Thus, there exists a technical problem of lack of mechanism for protecting sensitive content from being photographed.

To address these technical problems and more, in an example, this description provides technical solutions for preventing the circumvention of content security through taking a photograph of content on a screen. This may be achieved by modifying the display parameters such that any photograph taken of the content will include areas that are obfuscated. In an example, this is achieved by lowering the refresh rate and/or increasing the screen refresh line width of refresh rate of the display screen to cause a Moire Pattern to be generated on the screen. This is because when the refresh rate is decreased, the image is refreshed and rendered slower than normal. Because the changes still occur quickly, they are invisible to the human eye. However, when a picture is taken with a camera, one instance of the screen is captured. During that instance, some of the content will be in the process of loading and as such will be blurry or white patched per orientation of the screen content. As a result, random portions of the photograph will be blurry or blocked (e.g., white blocks). This results in parts of the content being randomly blocked from being photographed. As a result, the photograph cannot capture the content accurately and completely, thus preventing a user from capturing a clear image of the content via a camera. As a result, the technical solution provides an easy and efficient mechanism for ensuring security of sensitive content and preventing circumvention of security measures via devices outside of the computer device displaying the content.

As will be understood by persons of skill in the art upon reading this disclosure, benefits and advantages provided by such implementations can include, but are not limited to, a technical solution to the technical problems of lack of mechanisms for preventing capture and/or sharing of protected content via photographs taken from a screen on which content is displayed. The technical solutions include detection of protected content and automatically changing the display parameters to ensure a photograph taken of the content obfuscates some of the content. This results in an automatic and efficient mechanism for ensuring privacy of protected content, thus increasing customer satisfaction. In this manner, the technical solution increases security without affecting the user's view of the document. The technical effects include increasing security of protected content by preventing circumvention of security measures via secondary devices.

As used herein, the terms "protected content," and "sensitive content" may refer to any document or content in any document that is identified as requiring content protection. This may include content identified as being personal, private, confidential and/or highly confidential. Furthermore, the term "content," may refer to any data (e.g., text, multimedia, etc.) that is included in a document.

FIG. 1 illustrates an example system 100, upon which aspects of this disclosure may be implemented. The system 100 may include a client device 120 and a server 110. The client device 120 may be a type of personal, business or handheld computing device having or being connected to input/output elements that enable a user to interact with various applications (e.g., application 124 or application 112) to create and/or view content. Examples of suitable client devices 120 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 5 and 6.

The client device 120 may include a local application 124. The application 124 may be software programs executed on the client device 120 that configures the device to be responsive to user input to allow a user to perform various functions, such as viewing protected content in a document such as the document 132. The document 132 may be any digital document that contains data. The application 124 may provide content protection functionalities such as restricting access to any document or content labeled as being sensitive. Examples of suitable applications include but are not limited to a communication application such as an email application, word processing application, spreadsheet application, presentation application, and the like.

In some implementations, the application 124 provides a functionality for labeling a document as containing sensitive information. This may be achieved by enabling a user such as the author of the document to select a sensitivity label for the document. The sensitivity labels may include, normal, personal, private, and confidential. Other types of protection labels may include read-only, password-protected, and the like. Some of these sensitivity labels result in protecting the content from being edited by unauthorized users, while other sensitivity labels restrict access to the content. For example, a document labeled as being confidential or being password-protected may only be accessible by an authorized user (e.g., a user that has the password or a user indicated as being authorized to review the content). To ensure this, the application 124 may employ one or more mechanisms for preventing unauthorized access to protected content. For example, the application 124 may allow the receipt of a private email to open and view the email but prevent the recipient from forwarding the email.

One of the mechanisms employed by the application 124 for restricting access to protected content includes preventing a viewer of protected content from being able to take a picture of the content using a secondary device (e.g., a mobile device). To achieve this, the application 124 may make use of a content protection unit 126, which may manage content protection functionalities of the application 124. For example, when a request to open the document 132 is received, the application 124 may examine a sensitivity property of the document to determine if the document requires content protection. The property may be a label or flag that is generated when the user chooses a sensitivity label, is autogenerated by a machine-learning (ML) model or is autogenerated upon identification of specific keywords. The ML model may be trained based on keywords and/or patterns in user actions that indicate the presence of sensitive information. Keyword identification may be performed by a classifier that classifies certain terms as sensitive keywords. The property may be stored as metadata for the document 132 and may be accessible by accessing document metadata. When the application 124 determines, based on the sensitivity label, that document 132 requires content protection, the application 124 may transmit a request to the content protection unit 126 to enable content protection functionalities.

The content protection unit 126 may examine the sensitivity label (e.g., private, personal, confidential, and the like), to identify the types of content protection functionalities required. When the sensitivity label indicates that the content should not be shared with unauthorized users (e.g., confidential or private), the content protection unit 126 may transmit a request to the operating system 128 to adjust the display settings such that a photograph taken from the content does not produce a clear image. The operating system 128 may utilize a display management unit 130 to adjust the display settings.

Adjusting the display settings may involve decreasing the display frequency (e.g., refresh rate), while increasing the screen refresh line width of the refresh rate. For example, the refresh rate may be decreased from a native 60 Hz to 40 Hz, while the screen refresh line width is increased in size from a few pixels to few tens of pixels (e.g., from 1 pixel to 50 pixels). This results in slower response time when changes are made on the display (e.g., when the pointer is moved). However, because most of the content on the display screen in applications that provide content protection is static (e.g., unchanging), the slow refresh rate does not affect display quality. That is because since the content does not change quickly, the human eye cannot perceive the lower refresh rate. However, the lower refresh rate results in a slower rending of content. Accordingly, at any given instant, some of the content has not been rendered yet. The increased screen refresh line width ensures that the size of the unrendered content is large enough that it can block some of the content from being visible at any given instant. As a result, when a picture is taken from the content, in the instant when the picture is taken, some of the pixels will not be rendered. This results in the picture having white blocks at random locations within the picture. Thus, the effects of Moire Patterns are used to block portions of protected content in the picture, thus preventing the user from obfuscating content protection measures.

In some implementations, the content protection unit 126 transmits the required display settings to the operating system 128. The required display settings may be predetermined and may depend on the type of application, the type of content generated by the application and/or the sensitivity label. For example, for an application that primarily displays text (e.g., an email application), the refresh may be decreased significantly, since sudden changes to the display screen are unlikely and as such the lowered refresh rate is not likely to be noticeable to the user. A presentation application that generates documents that include animation may require a smaller decrease of the refresh rate. The size of refresh rate and/or screen refresh line width may also depend on the sensitivity label of the document. A document that is labeled highly confidential may require most of the content being blocked. As a result, the screen refresh line width for such as document may be significantly increased.

In addition to the display settings, the content protection unit 126 and/or application may communicate the location and/or coordinates of the display area displaying the protected content. For example, if, when opened, the email is being displayed in the right half of the screen, while the left side displays a different document, the coordinates for the email may be determined and transmitted by the application 124 to the operating system 128 such that only the part of the screen displaying the email will have adjusted refresh rate/screen refresh line width. In this manner, the adjusted display parameters do not negatively impact other applications/document that may require normal/increased refresh rates. When the protected document is closed or is minimized, the content protection unit 126 may transmit a message (via application 124) to the operating system to resume normal displaying settings.

In some examples, the application providing content protection functionalities is executed on the server 110 (e.g., application 112) and provided via an online service. In some implementations, web applications communicate via a network 140 with a user agent 122, such as a browser, executing on the client device 120. The user agent 122 may provide a user interface that allows the user to interact with the application 112 and view protected content. The application 112 may include a content protection unit 114 that functions in a similar manner as the local content protection unit 126. The content protection unit 114 may examine a document being opened via the application 112 to determine if the document requires content protection. When the content protection unit 114 determines that the document should not be accessible to unauthorized users, the content protection unit 114 may transmit a message to the user agent 122 to communicate with the operating system 128 to adjust the display settings. This may be achieved by using a browser plugin or browser extension that enables the user agent 122 to transmit a request to the operating system to adjust the display settings, as needed, to ensure any picture taken from the document includes blocked portions.

Figure 2A:
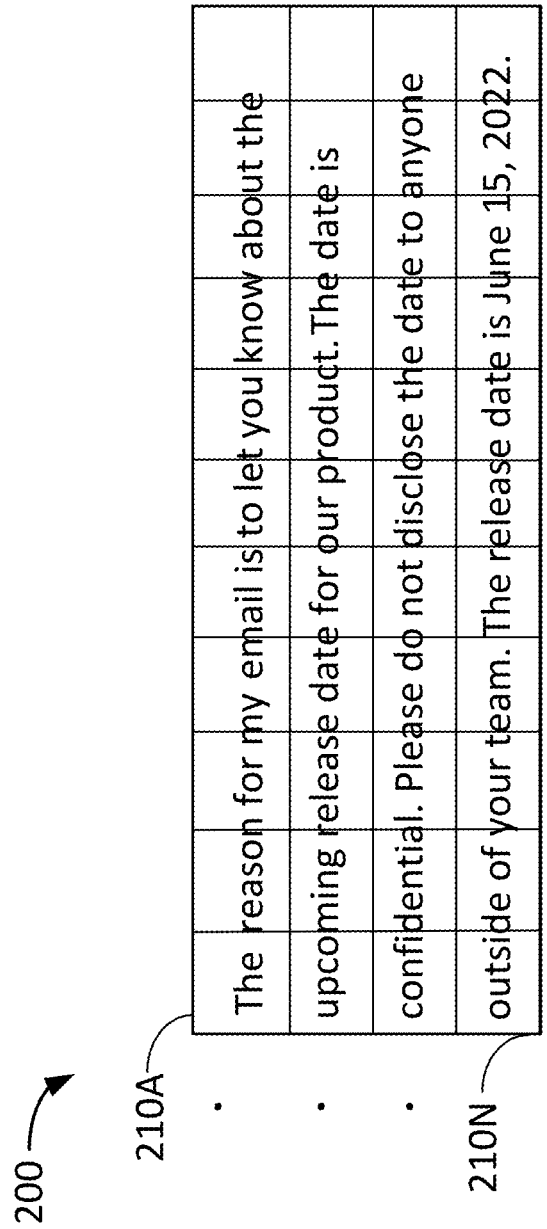
FIGS. 2A-2B depict an example of obfuscating content by implementing aspects of this disclosure.
Figure 2B:
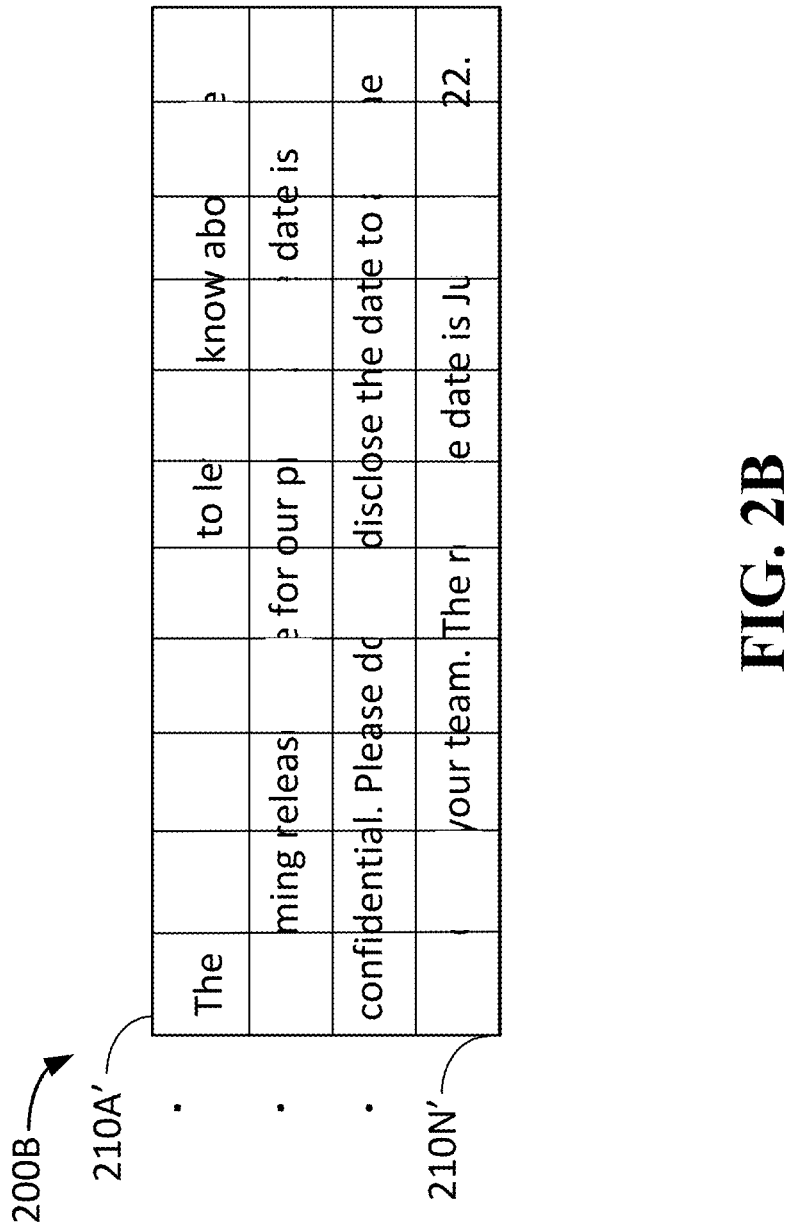

FIGS. 2A-2B depict an example of obfuscating content by implementing aspects of this disclosure. When displayed on graphical user interface screen (GUI), content 200 of FIG. 2A may be displayed using pixels that form the displayed image. The pixels may be parsed into small blocks 210A-210N (only a few of the blocks are identified with reference numerals). Each small block may represent multiple adjacent pixels. Thus, the content 200 may be divided into small blocks of pixels. When the refresh rate is decreased, the amount of time it takes for each of the blocks 210A-210N to be rendered on the GUI is longer than usual. As a result, at any given instant, some of the blocks 210A-210 may be in the process of being rendered or may not be rendered yet. This is depicted in FIG. 2B in which the revised content 200B includes blocks 210A'-210N', the content of some of which are obfuscated. For example, while block 210N of FIG. 2A contains the characters "ousi," the revised block 210N' of FIG. 2B displays a blank block. In some implementations, this creates a Moire Pattern that blocks at least some of the content from being displayed on a photograph taken from the content. While the revised content 200B may be captured when a photograph is taken from the GUI, the blocked content will not impact human viewing of the content on the screen. This is because content such as the content 200 is mostly static. As a result, and because while the refresh rates is lowered, it is still very fast for human perception, the blocked content will not be visible to human eyes on the screen, as the signals when sent to the human brain are averaged out to create a perception of consistency.

However, when a camera takes a picture of the screen. The image captures one instant of the display screen, thus capturing the blocked content 200B and preventing unauthorized access to protected content.

Figure 3A:
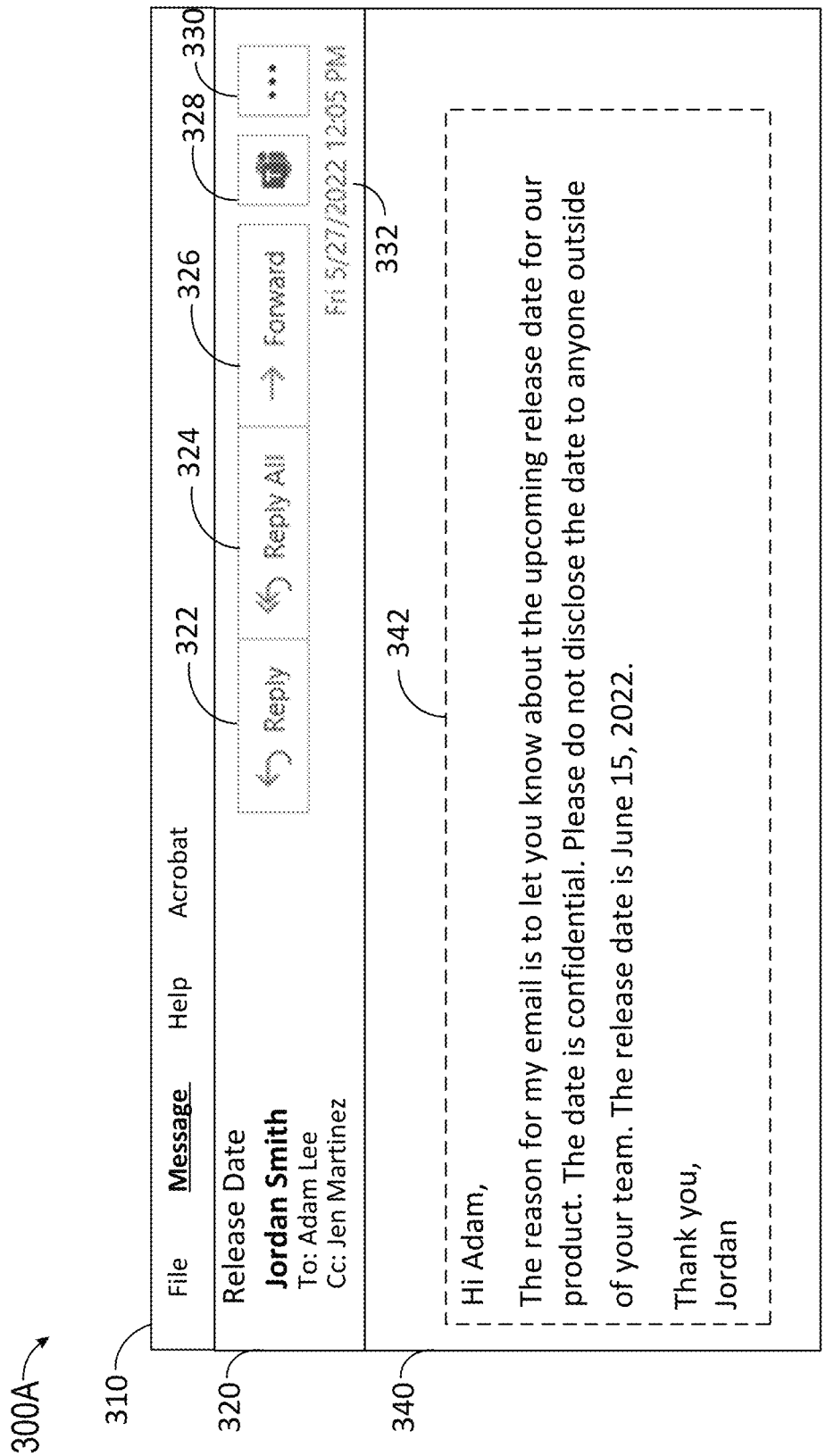
FIG. 3A depicts an example UI screen of an application that offers content protection services implementing aspects of this disclosure.

FIG. 3A depicts an example UI screen of an application that offers content protection services disclosed herein. The UI screen 300A of FIG. 3A may for example be displayed by a productivity application such as an email application (e.g., Microsoft Outlook®) when a received email message is opened. In an example, the UI screen 300A of the application may include a toolbar menu 310 that may display multiple tabs, each of which may provide multiple UI elements for performing various application features. For example, the toolbar menu 310 may provide options for the user to perform one or more tasks to store, delete, or reply to the message. The UI screen 300A may also include a message information pane 320, which may contain information such as the subject of the email, the person from which the email was received and any person that was copied on the email. In some implementations, the message information pane 320 also includes additional UI elements for enabling the user to perform various functions. For example, the UI element 322 allows the user to reply to the sender of the message, while the UI element 324 enables the user to reply to the sender and all people copied on the message. The UI element 326 may allow the user to forward the message. For messages that are indicated as being sensitive, the UI element 326 may be displayed to prevent the user from sharing the message with unauthorized users. The UI element 328 may enable the user to share the message with a communications application (e.g., Microsoft Teams®) and may similarly be disabled for messages containing protected content. The UI element 330 may offer multiple other functionalities such as scheduling a meeting with the sender, translating the message and the like. Furthermore, a UI portion 332 may display the date and time at which the email was received. The UI screen 300A may also include a content pane 340 which may contain the content of the email message 342. The content may be displayed to the user for viewing purposes.

Figure 3B:
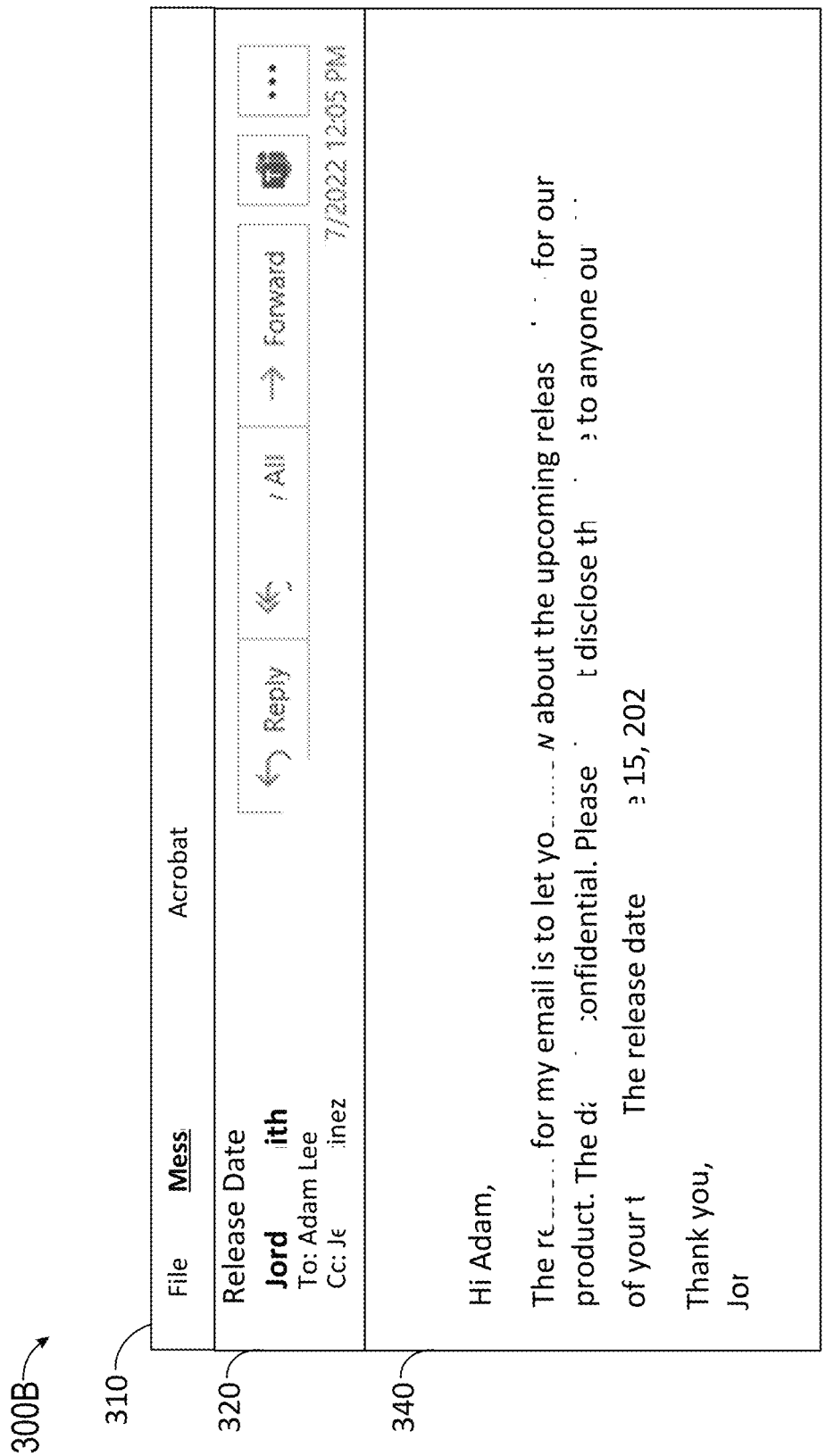
FIG. 3B depicts an image of a photograph taken from the example UI screen of FIG. 3A.

When the application displaying the message 342 determines that the message 342 is marked as containing protected subject matter, the application may send a signal to the operating system of the computing device displaying the message 342 to modify the display settings. The display settings may then be changed to ensure any picture taken from the message 342 does not fully capture the content. This is illustrated in the image 300B of FIG. 3B which depicts a photograph taken from the GUI screen 300A of FIG. 3A. As depicted, various areas of the image 300B are obfuscated, thus protecting the security of the content.

The extent to which areas of the image are obfuscated may depend on the refresh rate and/or screen refresh line width of the refresh rate. In some implementations, different refresh rate and screen refresh line widths are used for different sensitivity labels. A significantly lower refresh rate and/or larger screen refresh line width may be utilized for message that contain highly sensitive content (e.g., message is marked as confidential or highly confidential). This may result in the GUI screen taking a long time to render. As a result, any pictures taken from the screen may contain large areas of white or blurry space, thus blocking a majority of the content. Thus, by using an efficient mechanism that modifies the display settings, security of content can be increased.

Figure 4:
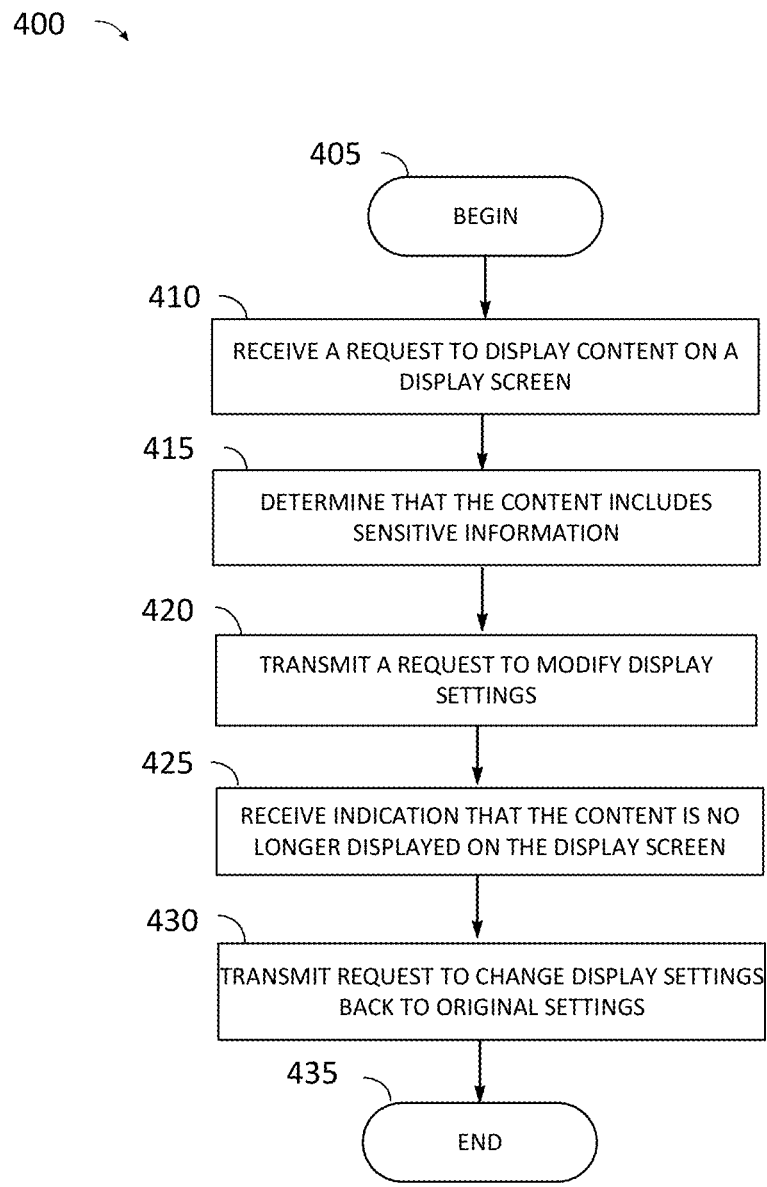
FIG. 4 is a flow diagram depicting an exemplary method for preventing circumvention of content security measures.

FIG. 4 is a flow diagram depicting an exemplary method 400 for preventing circumvention of content security measures. One or more steps of the method 400 may be performed by an application that displays sensitive content or by a content protection unit of such an application such as the content protection unit 126 of FIG. 1. The method 400 may begin, at 405, and proceed to receive a request to display content, at 410. This may occur, for example, when a user attempts to open a document that contains sensitive content or to click on an already open document which is not currently displayed on the display screen. For example, the request may be received, when a user clicks on an email message that has been labeled as being confidential. In some implementations, the request includes a location of the display screen on which the content is being displayed (e.g., left, right, top, bottom, center) and/or dimensions for the UI screen displaying the content. For example, the dimensions of the portion of the screen displaying the email message may be transmitted with the request.

After receiving the request, method 400 may proceed to determine whether the content includes sensitive information, at 415. This may involve examining a sensitivity label of the document containing the content. The sensitivity label may be a label selected by a user (e.g., author or sender of the document) and may include labels such as normal, private, personal, confidential, highly confidential, password-protected and the like. Each sensitivity label may be associated with specific security measures. A document labeled normal may not require any additional security measures. However, a document labeled confidential or highly confidential may require substantial security measure. For example, documents labeled confidential or highly confidential may be prevented from being shared (e.g., forwarded), being copy/pasted, and being captured in a screenshot. Furthermore, as disclosed herein, method 400 may ensure further protection of the content by preventing capture of a clear image of the content via a device having a camera.

Once it is determined that the content includes a type of sensitive information that requires content protection, method 400 may proceed to transmit a request to an operating system to modify the display settings of the display screen, at 420. The operating system may be associated with the device displaying the display screen (e.g., operating system of the client device displaying the content). The display settings may include a refresh rate of the display screen and a screen refresh line width of the display screen.

Modifying the display settings may include decreasing the refresh rate from a native (e.g., original) refresh rate for the display screen to a modified refresh rate. For example, if the native refresh rate is 60 frames per second, the refresh rate may be decreased to 30 frames per second. The amount by which the refresh rate is decreased may depend on the type of sensitivity label selected for the content. Content being labeled as highly sensitivity may lead to more decreases in the refresh rate. Modifying the display settings may also include increasing the screen refresh line width from a native (e.g., original) screen refresh line width to a decreased screen refresh line width.

In some implementations, the display settings are only modified for the portion of the display screen displaying the sensitive content. This may be achieved by receiving the location and/or dimension of the content and only modifying the refresh rate and/or screen refresh line width for that portion of the screen. This would prevent the modified display settings to negatively affect other applications that may be open on the user's screen. In such implementations, when the dimensions and/or location of the sensitive content is changed (e.g., the user moves the portion of the display screen displaying the sensitive content to a different location or resizes the window), updated location and/or dimensions may be transmitted to the operating system to change the portion of the display screen for which the display settings are modified.

Once the display settings have been modified, the operating system may continue utilizing the modified display settings for the sensitive content, until an indication is received that the content is no longer being displayed on the display screen, at 425. This may occur, when the window displaying the sensitive content is closed or minimized, or another window is overlayed on top of the window displaying the sensitive content (e.g., the user opens another document or moves a window over the sensitive content). Upon receiving the indication, method 400 may proceed to transmit a request to the operating system to change the display settings back to the original settings, at 430, before ending, at 435.

Figure 5:
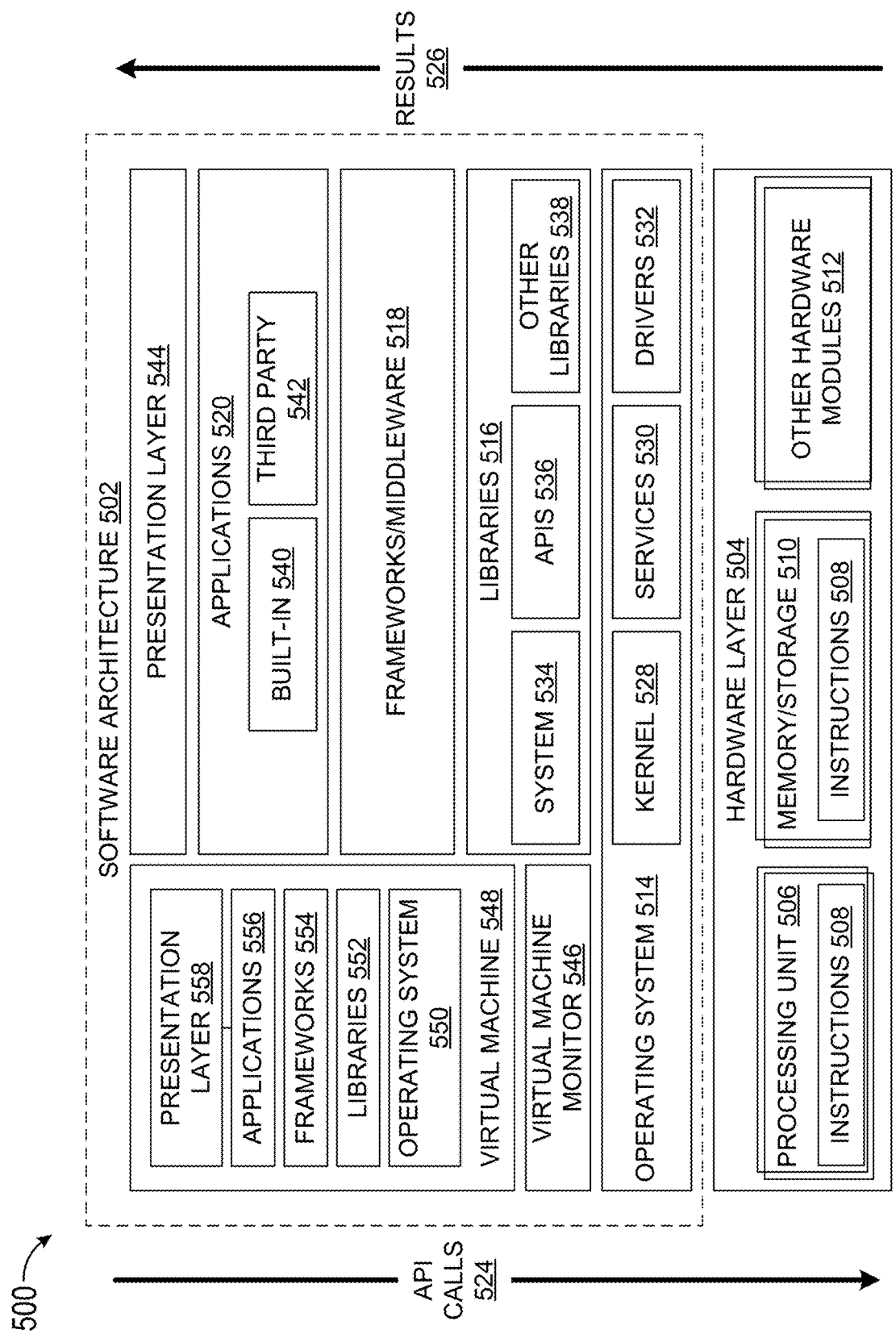
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
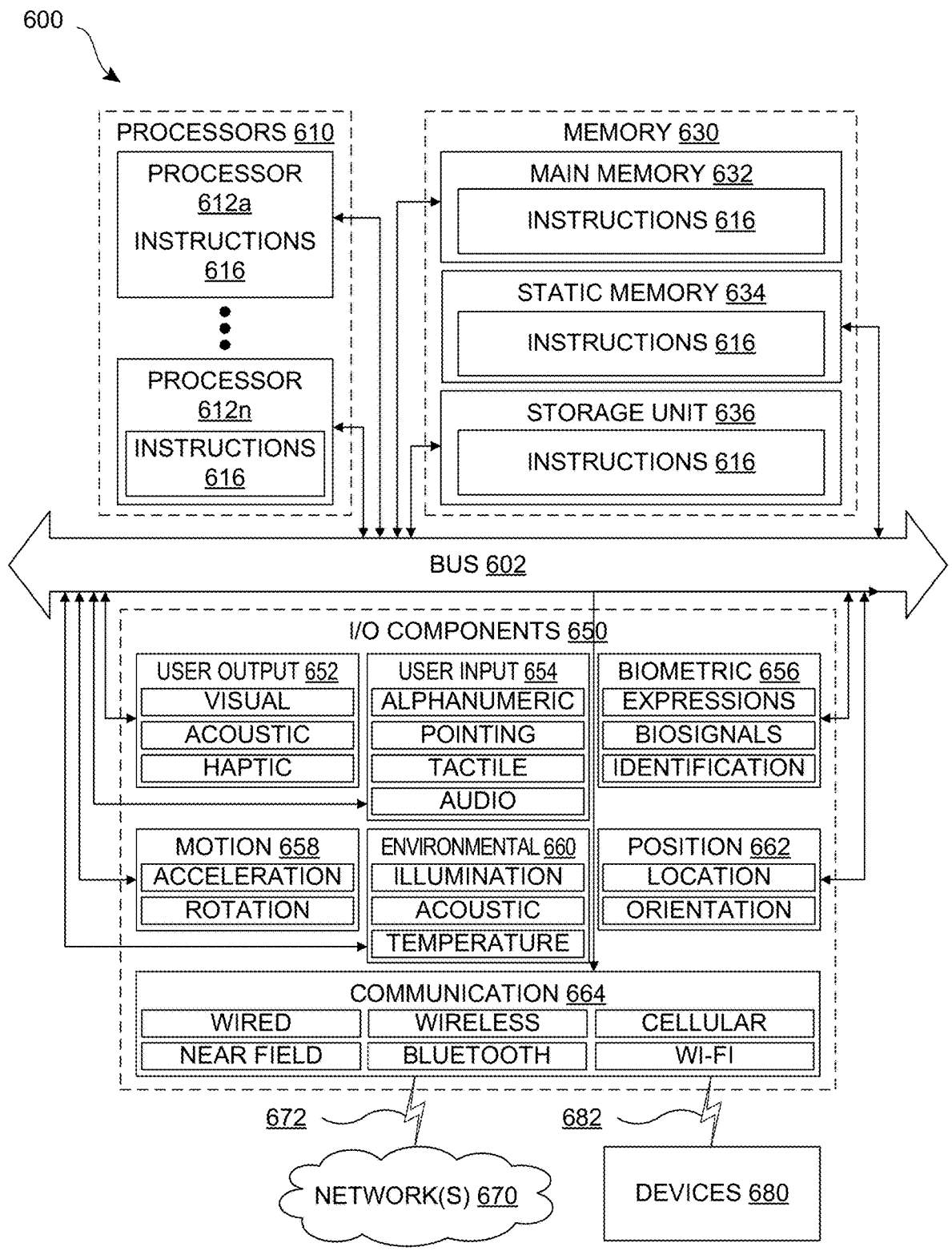
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
 a processor; and
 a memory in communication with the processor, the memory comprising executable instructions that, when executed by the processor, cause the data processing system to perform functions of:
 receiving a request to display a content on a display screen;
 upon receiving the request, determining that the content includes sensitive information; and
 upon determining that the content includes sensitive information, transmitting a first request to an operating system associated with the display screen to modify a plurality of display settings of the display screen from original display settings to modified display settings, the plurality of display settings including a screen refresh rate and a screen refresh line width,
 wherein the modified display settings prevent circumvention of content security through taking a photograph of the display screen.

Item 2. The data processing system of item 1, wherein modifying the display settings includes decreasing the screen refresh rate from an original screen refresh rate to a decreased screen refresh rate.

Item 3. The data processing system of item 2, wherein an amount by which the screen refresh rate is decreased is related to a sensitivity level of the content.

Item 4. The data processing system of any preceding item, wherein modifying the display settings includes increasing the screen refresh line width from an original screen refresh line width to an increased screen refresh line width.

Item 5. The data processing system of item 4, wherein an amount by which the screen refresh line width is increased is related to a sensitivity level of the content.

Item 6. The data processing system of any preceding item, wherein determining that the content includes sensitive information is done by at least one of examining a sensitivity label associated with the content, utilizing a machine-learning (ML) model for identifying sensitive content or detecting one or more keywords that indicate presence of sensitive information.

Item 7. The data processing system of any preceding item, wherein the executable instructions, when executed by the processor, further cause the data processing system to perform functions of:
 receiving an indication that the content is no longer displayed on the display screen; and
 upon receiving the indication, sending a second request to the operating system to modify the plurality of display settings from the modified display settings to the original display settings.

Item 8. The data processing system of any preceding item, wherein:
 the first request includes information about at least one of a location of the content on the display screen and a dimension of the content on the display screen, and
 the display settings are only modified for a portion of the display screen displaying the content.

Item 9. A method for preventing circumvention of content security measures comprising:
receiving a request to display a content on a display screen;
upon receiving the request, determining that the content includes sensitive information; and
upon determining that the content includes sensitive information, transmitting a first request to an operating system associated with the display screen to modify a plurality of display settings of the display screen from original display settings to modified display settings, the plurality of display settings including a screen refresh rate and a screen refresh line width,
wherein the modified display settings prevent circumvention of content security through taking a photograph of the display screen.

Item 10. The method of item 9, wherein modifying the display settings includes decreasing the screen refresh rate from an original screen refresh rate to a decreased screen refresh rate.

Item 11. The method of item 10, wherein an amount by which the screen refresh rate is decreased is related to a sensitivity level of the content.

Item 12. The method of any of items 9-11, wherein modifying the display settings includes increasing the screen refresh line width from an original screen refresh line width to an increased screen refresh line width.

Item 13. The method of item 12, wherein an amount by which the screen refresh line width is increased is related to a sensitivity level of the content.

Item 14. The method of any of items 9-13, wherein determining that the content includes sensitive information is done by at least one of examining a sensitivity label associated with the content, utilizing a machine-learning (ML) model for identifying sensitive content or detecting one or more keywords that indicate presence of sensitive information.

Item 15. The method of any of items 9-14, further comprising:
receiving an indication that the content is no longer displayed on the display screen; and
upon receiving the indication, sending a second request to the operating system to modify the plurality of display settings from the modified display settings to the original display settings.

Item 16. The method of items 9-15, wherein:
the first request includes information about at least one of a location of the content on the display screen and a dimension of the content on the display screen, and
the display settings are only modified for a portion of the display screen displaying the content.

Item 17. A non-transitory computer readable medium on which are stored instructions that, when executed, cause a programmable device to perform functions of:
receiving a request to display a content on a display screen;
upon receiving the request, determining that the content includes sensitive information; and
upon determining that the content includes sensitive information, transmitting a first request to an operating system associated with the display screen to modify a plurality of display settings of the display screen from original display settings to modified display settings, the plurality of display settings including a screen refresh rate and a screen refresh line width,
wherein the modified display settings prevent circumvention of content security through taking a photograph of the display screen.

Item 18. The non-transitory computer readable medium of item 17, wherein modifying the display settings includes:
decreasing the screen refresh rate from an original screen refresh rate to a decreased screen refresh rate, and
increasing the screen refresh line width from an original screen refresh line width to an increased screen refresh line width.

Item 19. The non-transitory computer readable medium of items 17 or 18, wherein the instructions when executed, further cause a programmable device to perform functions of:
receiving an indication that the content is no longer displayed on the display screen; and
upon receiving the indication, sending a second request to the operating system to modify the plurality of display settings from the modified display settings to the original display settings.

Item 20. The non-transitory computer readable medium of any of items 17-20, wherein:
the first request includes information about at least one of a location of the content on the display screen and a dimension of the content on the display screen, and
the display settings are only modified for a portion of the display screen displaying the content.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request to display a content on a display screen;
upon receiving the request, determining that the content includes sensitive information; and
upon determining that the content includes sensitive information, transmitting a first request to an operating system associated with the display screen and modifying a plurality of display settings of the display screen from original display settings to modified display settings in response to the first request, the plurality of display settings including a screen refresh rate and a screen refresh line width,
wherein:
the modified display settings prevent circumvention of content security through taking a photograph of the display screen;
modifying the display settings includes decreasing the screen refresh rate from an original screen refresh rate to a decreased screen refresh rate; and
an amount by which the screen refresh rate is decreased is related to a sensitivity level of the content.

2. The data processing system of claim 1, wherein determining that the content includes sensitive information is done by at least one of examining a sensitivity label associated with the content, utilizing a machine-learning (ML) model for identifying sensitive content or detecting one or more keywords that indicate presence of sensitive information.

3. The data processing system of claim 1, wherein the executable instructions, when executed by the processor, further cause the data processing system to perform functions of:
receiving an indication that the content is no longer displayed on the display screen; and
upon receiving the indication, sending a second request to the operating system to modify the plurality of display settings from the modified display settings to the original display settings.

4. The data processing system of claim 1, wherein:
the first request includes information about at least one of a location of the content on the display screen and a dimension of the content on the display screen, and
the display settings are only modified for a portion of the display screen displaying the content.

5. A data processing system comprising:
a processor; and
a memory in communication with the processor, the memory comprising executable instructions that, when executed by the processor, cause the data processing system to perform functions of:
receiving a request to display a content on a display screen;
upon receiving the request, determining that the content includes sensitive information; and
upon determining that the content includes sensitive information, transmitting a first request to an operating system associated with the display screen and modifying a plurality of display settings of the display screen from original display settings to modified display settings in response to the first request, the plurality of display settings including a screen refresh rate and a screen refresh line width,
wherein:
the modified display settings prevent circumvention of content security through taking a photograph of the display screen; and
modifying the display settings includes increasing the screen refresh line width from an original screen refresh line width to an increased screen refresh line width.

6. The data processing system of claim 5, wherein an amount by which the screen refresh line width is increased is related to a sensitivity level of the content.

7. A method for preventing circumvention of content security measures comprising:
receiving a request to display a content on a display screen;
upon receiving the request, determining that the content includes sensitive information; and
upon determining that the content includes sensitive information, transmitting a first request to an operating system associated with the display screen and modifying a plurality of display settings of the display screen from original display settings to modified display settings in response to the first request, the plurality of display settings including a screen refresh rate and a screen refresh line width,
wherein:
the modified display settings prevent circumvention of content security through taking a photograph of the display screen;
modifying the display settings includes decreasing the screen refresh rate from an original screen refresh rate to a decreased screen refresh rate; and an amount by which the screen refresh rate is decreased is related to a sensitivity level of the content.

8. The method of claim 7, wherein determining that the content includes sensitive information is done by at least one of examining a sensitivity label associated with the content, utilizing a machine-learning (ML) model for identifying sensitive content or detecting one or more keywords that indicate presence of sensitive information.

9. The method of claim 7, further comprising:
receiving an indication that the content is no longer displayed on the display screen; and
upon receiving the indication, sending a second request to the operating system to modify the plurality of display settings from the modified display settings to the original display settings.

10. The method of claim 7, wherein:
the first request includes information about at least one of a location of the content on the display screen and a dimension of the content on the display screen, and
the display settings are only modified for a portion of the display screen displaying the content.

11. A method for preventing circumvention of content security measures comprising:
receiving a request to display a content on a display screen;
upon receiving the request, determining that the content includes sensitive information;
upon determining that the content includes sensitive information, transmitting a first request to an operating system associated with the display screen and modifying a plurality of display settings of the display screen from original display settings to modified display settings in response to the first request, the plurality of display settings including a screen refresh rate and a screen refresh line width, wherein the modified display settings prevent circumvention of content security through taking a photograph of the display screen; and
modifying the display settings includes increasing the screen refresh line width from an original screen refresh line width to an increased screen refresh line width.

12. The method of claim 11, wherein an amount by which the screen refresh line width is increased is related to a sensitivity level of the content.

13. A non-transitory computer readable medium on which are stored instructions that, when executed, cause a programmable device to perform functions of:
receiving a request to display a content on a display screen;
upon receiving the request, determining that the content includes sensitive information; and
upon determining that the content includes sensitive information, transmitting a first request to an operating system associated with the display screen and modifying a plurality of display settings of the display screen from original display settings to modified display settings in response to the first request, the plurality of display settings including a screen refresh rate and a screen refresh line width,
wherein:
the modified display settings prevent circumvention of content security through taking a photograph of the display screen; and
modifying the display settings includes:
decreasing the screen refresh rate from an original screen refresh rate to a decreased screen refresh rate, and
increasing the screen refresh line width from an original screen refresh line width to an increased screen refresh line width.

14. The non-transitory computer readable medium of claim 13, wherein the instructions when executed, further cause a programmable device to perform functions of:
receiving an indication that the content is no longer displayed on the display screen; and
upon receiving the indication, sending a second request to the operating system to modify the plurality of display settings from the modified display settings to the original display settings.

15. The non-transitory computer readable medium of claim 13, wherein:
the first request includes information about at least one of a location of the content on the display screen and a dimension of the content on the display screen, and
the display settings are only modified for a portion of the display screen displaying the content.

* * * * *